United States Patent
Zwickler et al.

(10) Patent No.: US 10,167,752 B2
(45) Date of Patent: Jan. 1, 2019

(54) ENGINE OIL PUMP WITH ELECTRONIC OIL PRESSURE CONTROL

(71) Applicant: GM GLOBAL TECHNOLOGY OPERATIONS LLC, Detroit, MI (US)

(72) Inventors: Georg Zwickler, Ruesselsheim (DE); Bryan K. Pryor, Ruesselsheim (DE); Georg Hedrich, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/430,025

(22) Filed: Feb. 10, 2017

(65) Prior Publication Data
US 2018/0230870 A1    Aug. 16, 2018

(51) Int. Cl.
*F01M 1/02*    (2006.01)
*F01M 11/00*    (2006.01)
*F04C 2/344*    (2006.01)
*F04C 13/00*    (2006.01)
*F04C 14/22*    (2006.01)

(52) U.S. Cl.
CPC .......... *F01M 1/02* (2013.01); *F01M 11/0004* (2013.01); *F04C 2/344* (2013.01); *F04C 13/001* (2013.01); *F04C 14/22* (2013.01); *F01M 2001/0238* (2013.01); *F01M 2011/0079* (2013.01); *F04C 2240/40* (2013.01)

(58) Field of Classification Search
CPC ................. F01M 1/02; F01M 11/0004; F01M 2001/0238; F01M 2011/0079; F04C 14/22; F04C 13/001; F04C 2/344; F04C 2240/40
See application file for complete search history.

(56) References Cited

U.S. PATENT DOCUMENTS

| | | | |
|---|---|---|---|
| 6,470,992 B2 * | 10/2002 | Nissen .................. | B62D 5/062 180/429 |
| 6,763,797 B1 | 7/2004 | Staley et al. | |
| 6,817,438 B2 * | 11/2004 | Modrzejewski ....... | B62D 5/062 180/421 |
| 7,344,361 B2 | 3/2008 | Kiefer | |
| 2011/0030051 A1 | 2/2011 | Bui et al. | |

OTHER PUBLICATIONS

Country Patent Office, Country Search Report for Country Application Number _, date.

* cited by examiner

*Primary Examiner* — Hung Q Nguyen
(74) *Attorney, Agent, or Firm* — Lorenz & Kopf, LLp

(57) ABSTRACT

A variable displacement vane pump with electronic oil pressure control provides efficient pumping of engine oil precise regulation of engine oil pressure. The variable displacement oil pump includes a rotor supported in a housing for rotation about an axis of rotation and a slide ring movably supported in the housing. A plurality of vanes extends between the rotor and the slide ring to define a plurality of variable displacement pumping chambers. An electronic drive mechanism is configured to position the slide ring with respect to the axis of rotation, and a controller is configured to drive the electronic drive mechanism for selectively positioning the slide ring to adjust an eccentricity of the slide ring relative to the axis of rotation such that the displacement of the pumping chambers is varied.

13 Claims, 4 Drawing Sheets

ENGINE OIL PUMP WITH ELECTRONIC OIL PRESSURE CONTROL

TECHNICAL FIELD

The present disclosure relates to a variable displacement oil pump supplying engine oil to an internal combustion engine and, more particularly to a pump having an electric motor variably controlling pump displacement.

BACKGROUND

The lubrication system of an engine pressurizes and distributes lubrication fluid, e.g. oil, to the engine lubrication circuits by use of a pump such as a variable displacement vane pump (VDVP). Such a pump typically employs a rotor, a slide and multiple radially extending slidable vanes and cavities which can vary the volume of fluid delivered to the lubrication circuits. The slide is eccentrically offset from the rotor to create pumping chambers defined by the vanes, rotor and inner surface of the slide. A compression spring biases the slide to create large pumping chambers as the default.

When the engine requires less volume of oil or less oil pressure from the pump, a pressure regulator directs oil from the pump output to a regulating chamber in the pump. Pressure in the regulating chamber counteracts the spring biasing force to move the slide into a position which is more closely align the center of the slide with the center of the rotor. As a result, the size of the pumping chambers is reduced. Reducing the pumping chambers reduces the amount of oil drawn into the pump from an oil sump such that the amount of oil output by the pump and the oil pressure are reduced.

Several influence factors come into play with the hydro-mechanical control of the pump displacement as described above. Rotation of the slide about a pivot pin is affected by three forces: the hydraulic forces in the pumping chambers; the slide spring biasing force; and the hydraulic forces in the regulating chamber. The regulating chamber hydraulic force depends on the oil pressure in the regulating chamber, which is controlled by a pilot valve inside an oil control valve. Thus, the regulating hydraulic force is affected by the forces acting on the pilot valve including a pilot valve spring force, a pilot valve hydraulic force and an electrically-generated magnetic force. In addition, the tolerance of a control port in the oil control used for feeding and draining the regulating chamber can also affect control of the pump displacement.

However, further improvements to variable displacement vane pumps and, in particular, oil pressure control of a variable displacement vane pumps with a movable slide for use in engine lubrication systems are desirable. In addition, other improvements, desirable features and characteristics are desirable and will become apparent from the subsequent summary and detailed description, and the appended claims, taken in conjunction with the accompanying drawings and this background.

SUMMARY

A variable displacement vane pump provides electronic oil pressure control by precisely positioning a pump cage or ring for adjusting the pump displacement, and thus achieving more efficient pumping of engine oil and improved regulation of engine oil pressure.

In an exemplary embodiment, the variable displacement oil pump includes a rotor supported in a housing for rotation about an axis of rotation. A slide ring is movably supported in the housing. A plurality of vanes extends between the rotor and the slide ring to define a plurality of variable displacement pumping chambers. An electronic drive mechanism is configured to position the slide ring with respect to the axis of rotation, and a controller is configured to drive the electronic drive mechanism for selectively positioning the slide ring to adjust an eccentricity of the slide ring relative to the axis of rotation such that the displacement of the pumping chambers is varied.

In another exemplary embodiment, an internal combustion engine includes an oil pan mounted below an engine block having an oil sump for containing lubricating oil. A variable displacement oil pump includes an inlet in fluid communication with the oil sump to draw oil therefrom and an outlet in fluid communication with lubrication passages to supply pressurized oil to engine components. The variable displacement oil pump includes a rotor supported in a housing for rotation about an axis of rotation. A slide ring is movably supported in the housing. A plurality of vanes extends between the rotor and the slide ring to define a plurality of variable displacement pumping chambers. An electronic drive mechanism is configured to position the slide ring with respect to the axis of rotation, and a controller is configured to drive the electronic drive mechanism for selectively positioning the slide ring to adjust an eccentricity of the slide ring relative to the axis of rotation such that the displacement of the pumping chambers is varied.

The electronic oil pressure control enabled with the use of an electronic drive mechanism for positioning the slide ring advantageously provides more accurate and more stable oil pressure, and eliminates hydraulically generated oil pressure pulsations. Moreover, the engine oil lubrication system is not limited to a lowest desired oil pressure and can respond more quickly to provide the desired oil pressure, particularly at a cold engine start condition. As a result, the engine oil lubrication system is easier and faster to calibrate and has less oil flow/leakage at the control chamber and the oil control valve, which yields reduced fuel consumption. Finally, the engine oil lubrication system disclosed herein simplifies the oil pump components which may provide a cost savings and/or packaging space reduction.

BRIEF DESCRIPTION OF THE DRAWINGS

The present disclosure will hereinafter be described in conjunction with the following drawing figures, wherein like numerals denote like elements.

DETAILED DESCRIPTION

Figure 1:
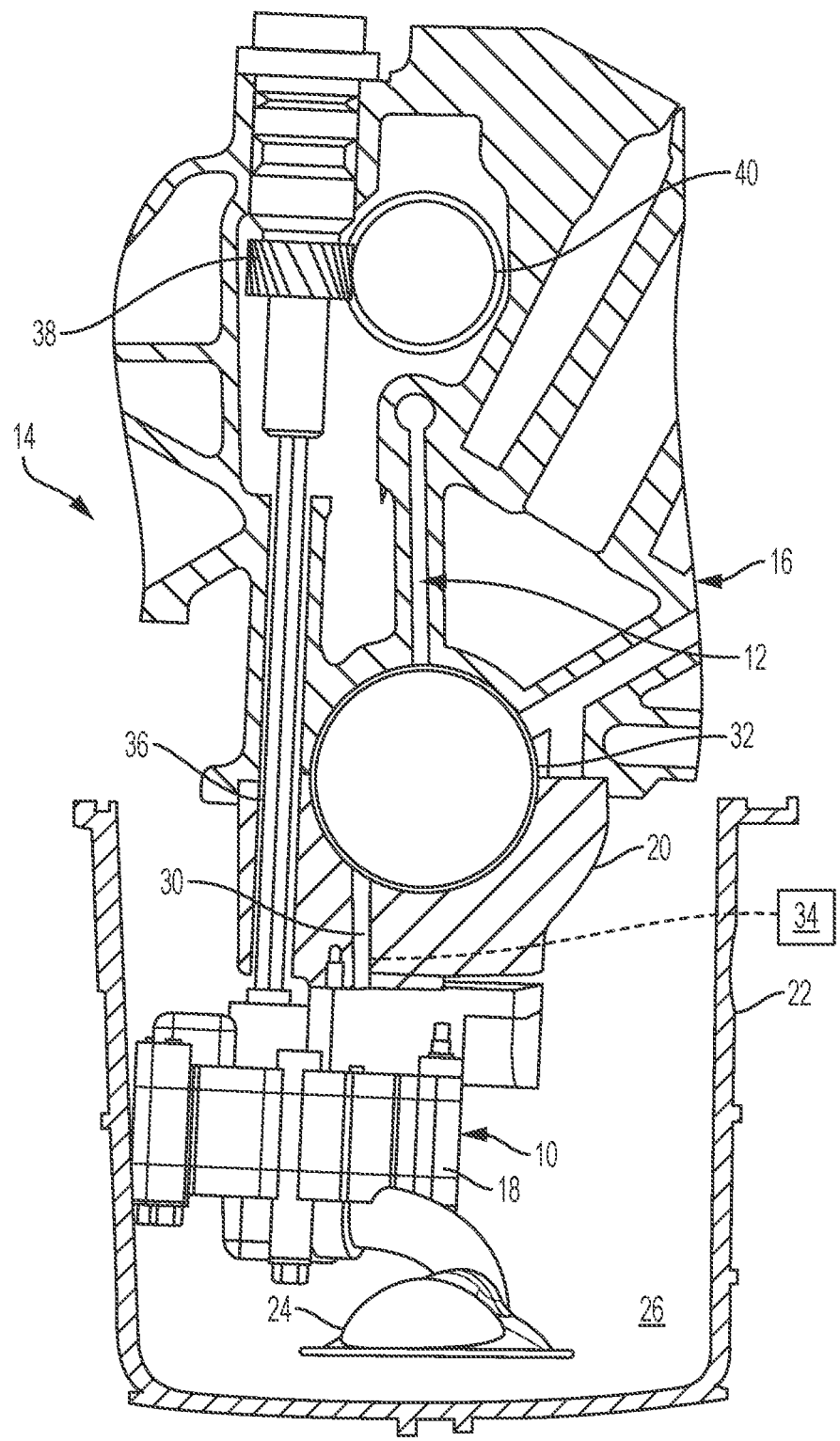
FIG. 1 is a cross-sectional view of portions of an engine showing the pump mounting and drive connected in the engine oil lubrication system.

The following detailed description is merely exemplary in nature and is not intended to limit the invention or the application and uses of the invention. Furthermore, there is no intention to be bound by any theory presented in the preceding background of the invention or the following detailed description.

Referring now to the drawings, numeral 10 generally indicates a variable displacement vane engine oil pump in accordance with various embodiments of the present invention. As is more fully hereinafter described, the variable displacement vane pump 10 provides for precise control of the pump cage or ring with an electric motor for adjusting the pump displacement, and thus achieving more efficient pumping of engine oil and improved regulation of engine oil pressure.

In FIG. 1, a variable displacement vane engine oil pump 10 is shown integrated into an engine oil lubrication system 12 of an automotive internal combustion engine 14 having a cylinder block 16. A pump housing 18 of the vane pump 10 is attached to the bottom of a rear main bearing cap 20 by a mounting bolt (not shown). The vane pump 10 is located below the bearing cap 20 within the engine oil pan 22. An oil pick-up tube 24 extends into an oil sump 26 close to the bottom of the oil pan 22 to draw in oil from the pump in a conventional manner.

An oil pressure passage 30 extends through the rear main bearing cap 20 to the crankshaft oil feed on the backside of the rear main bearing 32, and is configured with an oil pressure sensor 34 for measuring an oil pressure of the pump 10. A drive shaft 36 extends from a driven gear 38 near the upper end of the engine cylinder block 16 and down into the vane pump 10 through the pump housing 18 and is powered by rotation of a camshaft drive gear 40 when the engine 14 is running.

Figure 2:
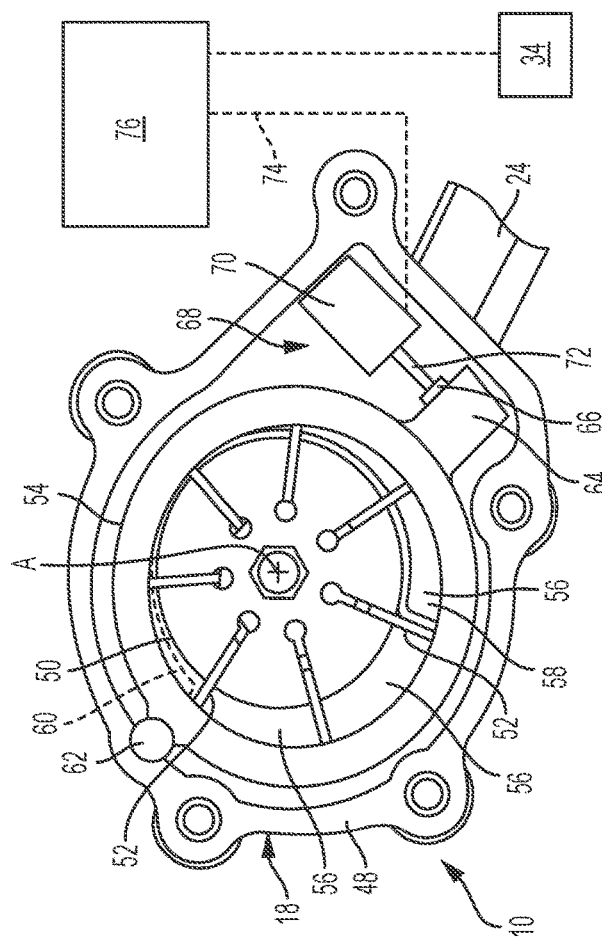
FIG. 2 is a plan view of variable displacement vane oil pump with the top cover of the housing removed to show a linear drive mechanism configured to pivot a slide ring for varying the displacement of the oil pump.

In FIG. 2, the housing 18 of variable displacement vane pump 10 includes a wall 48. A rotor 50 having a plurality of slide vanes 52 is rotatable in the housing 18 on a fixed axis A. The slide vanes 52 internally engage a slide ring 54 to define pumping chambers 56 within the slide ring 54. Vane rings (not shown) float in counterbores on opposite sides of the rotor 50 and engage inner edges of the slide vanes 52 to help them maintain contact with the slide ring 54. An inlet port 58 is formed in an inlet side of the housing 18 and an outlet port 60 (shown in hidden lines) is formed in an outlet side of the housing 18. The ports 58, 60 communicate with the pumping chambers 56 in the slide ring 54 on opposite bottom and top sides of the rotor 50.

The oil pick-up tube 26, attached to the inlet side of the housing 18, connects to the inlet port 58 and extends below and away from the housing 18. The rotor 50 is powered by the drive shaft 36. Rotation of the rotor 50 by the shaft drive 36 causes oil to be drawn into the pumping chambers 56 through the inlet port 58 and discharged from the pumping chambers 56 through the outlet port 60.

The slide ring 54 is pivotally retained against the housing 18 by a slide ring pivot 62. A slide arm 64 extends outward from the slide ring 54 at a location opposite from the slide ring pivot 62. The slide arm 64 includes a drive mount 66. A linear drive mechanism 68 is mounted in the housing 18 and includes an electronic motor 70 and a linear actuator 72 coupled to the drive mount 66. In response to a control signal (indicated by a dashed line 74) from a motor controller 76, the linear actuator 72 extends or retracts along its longitudinal axis such that linear drive mechanism 68 imparts a force on the slide arm 64 causing the slide ring 54 to pivot about the slide ring pivot 62. Once so positioned, the slide ring 54 is held in place by the linear drive 68 without providing additional power to the electronic motor 70. In other words, the motor 70 only draws power when it is energized when an oil pressure adjustment is required.

Figure 3:
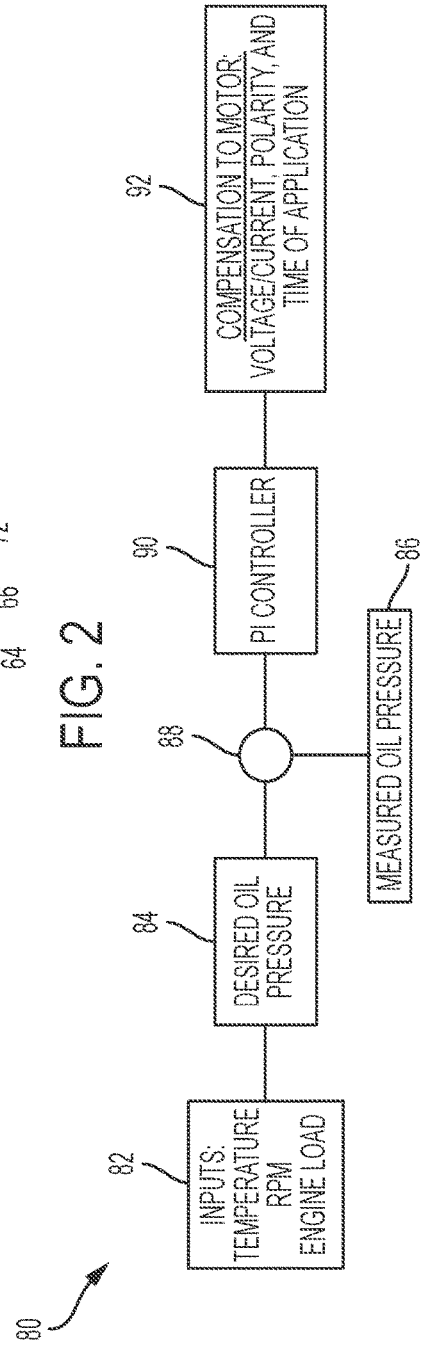
FIG. 3 is a block diagram showing a simplified motor control for positioning a cage or ring in a variable displacement vane pump.

While different control algorithms of varying complexity may be used for the motor controller 76, a simple control logic 80 as illustrated in FIG. 3 provides for precise positioning of the slide ring 54 with an electric motor 70 for adjusting the pump displacement, and thus achieving more efficient pumping of engine oil and improved regulation of engine oil pressure. With reference to FIG. 3, the motor controller 76 acquires various engine operating parameters at block 82, such as engine speed, engine load and engine temperature, from suitable engine sensors and determines a desired oil pressure at block 84 based on the operating parameters. The motor controller 76 also acquires a measured oil pressure at block 86 from oil pressure sensor 34. An error value is computed at block 88 based on the desired oil pressure and the measured oil pressure and used in a PI controller 90 and applies a correction to the control signal 74 based on the proportional and integral terms of the error value. The control logic 80, and in particular the PI controller 90 may account for motor characteristics and dynamics at block 92 such as voltage/current, polarity and application timing.

Referring now to FIGS. 1 and 2, the vane pump 10 is integrated into the oil lubrication system 12 of the engine 14 to efficiently maintain engine oil pressure. During operation of the engine, the camshaft drive gear 40 turns the drive shaft 36, which in turn causes the rotor 50 inside the vane pump 10 to rotate on its axis a. The spinning of the rotor 50 causes oil to be drawn from the oil sump 26 through the oil pick-up tube 24 into the pumping chambers 56 and forced out to the oil lubrication system 12 through the outlet port 60. As the engine 14 and vane pump 10 operate, oil flow is generated by the vane pump 10. An oil pressure is measured by the oil pressure sensor 34 and a signal, indicative of the relative system oil pressure, is sent to the motor controller 76 to determine if the vane pump 10 is providing the desired oil pressure or if an adjustment needs to be made.

The slide ring 54 is pivotable about the slide ring pivot 62 to vary the displacement of the pumping chambers 56. The displacement of the pump 10 is proportional to the eccentricity of the slide ring 54 relative to the axis A of the rotor 50. When the pump 10 is at rest, the linear actuator 72 is fully extended such that the slide ring 54 is pivoted into a position of maximum eccentricity relative to the rotor 50 as shown in FIG. 2. When the pump 10 operates with the slide ring 54 in this position, the displacement of the pump 10 is at its maximum value. If the linear actuator 72 is retracted the slide ring 54 pivots (counterclockwise in FIG. 2) away from a position of maximum eccentricity. As the eccentricity of the slide ring 54 relative to the rotor 50 is reduced, the vane pump 10 pumps relatively less oil at each rotational cycle. Thus, a steady oil pressure is maintained while the torque of the drive shaft 36 required to drive the pump 10 is proportionately reduced. When the linear actuator 72 is fully retracted, the center of the slide ring 54 is pivoted to a position at which it is aligned with the axis A of the rotor 50. In this position, the slide ring 54 is at 0% eccentricity (i.e., 100% from its maximum eccentricity) and the pump 10 operates at zero displacement, thus eliminating the need for a pressure relief valve for the oil pump.

Figure 4:
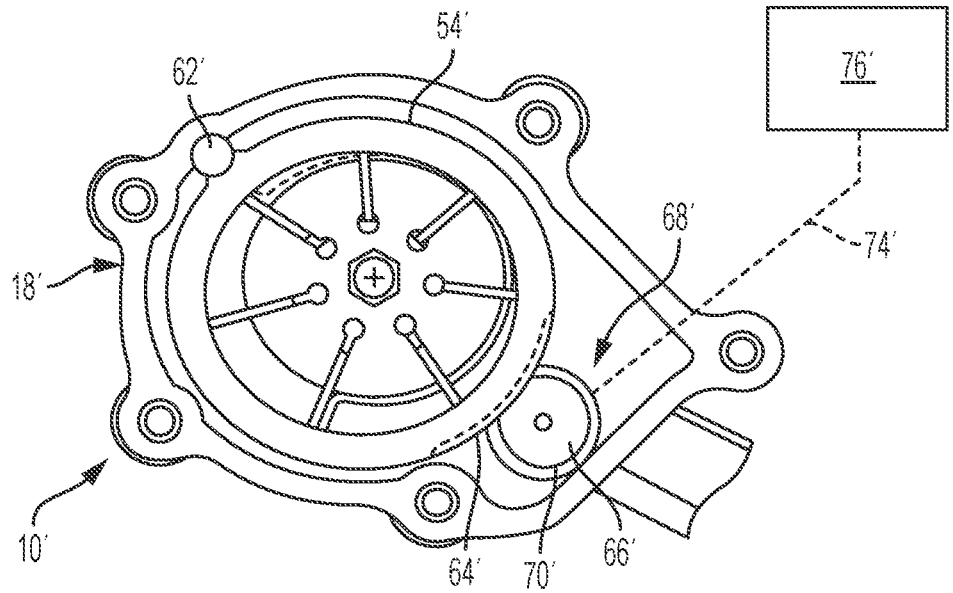
FIG. 4 is a plan view of the vane oil pump shown in FIG. 2 having a rotary gear drive mechanism configured to pivot the slide ring.

With reference now to FIG. 4, a vane pump 10' is substantially similar to the vane pump 10 described in conjunction to FIG. 2 with the exception of the drive mechanism used for varying the displacement of the pump. Instead of using a linear drive mechanism, vane pump 10' includes a rotary drive mechanism 68' mounted in housing 18' and operable to position the slide ring 54'. The rotary drive mechanism 68' includes a gear sector 64' formed on an outer circumference of the slide ring 54' at a location tangential to a radius extending from the slide ring pivot 62'. A pinion gear 66' meshingly engages the gear sector 64'. The pinion gear 66' is rotatably coupled to an electronic motor 70'. In response to the control signal (indicated by a dashed line 74') from the motor controller 76', the electronic motor 70' rotates the pinion gear 66' and drives the gear sector 64' causing the slide ring 54' to pivot about the slide ring pivot 62'. Once so positioned, the slide ring 54' is held in place by the rotary drive mechanism 68' without providing additional power to the electronic motor 70'.

While the electronic motor 70' is illustrated as directly driving the pinion gear 66', one skilled in the art will recognize that a set of gears may be used for speed reduction and torque multiplication. Alternately, the orientation of the electrical motor 70' may be changed such that a worm gear is used in place of the pinion gear 66'. As a further alternative, the location of the driven gear (i.e., the gear sector 64') may be changed to another suitable location on the slide ring 54' or on the slide ring pivot 62', or the electronic motor 70' may directly rotate the slide ring pivot 62'.

Figure 5:
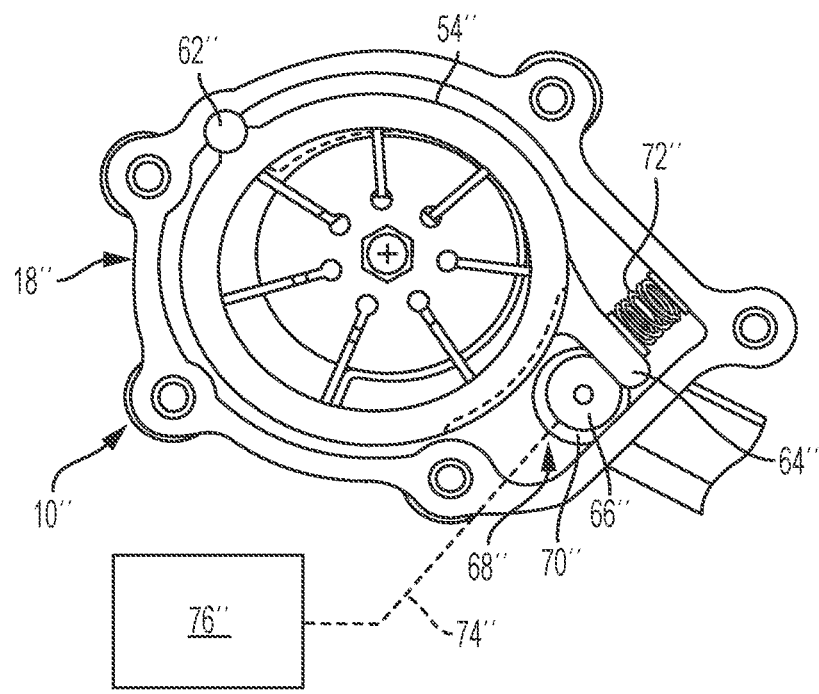
FIG. 5 is a plan view of the vane oil pump shown in FIG. 2 having a rotary cam mechanism configured to pivot the slide ring.

With reference now to FIG. 5, a vane pump 10" is substantially similar to vane pumps 10, 10' but for the drive mechanism used for varying the displacement of the pump. Similar to vane pump 10, a slide arm 64" extends outward from the slide ring 54" at a location opposite from the slide ring pivot 62". Similar to vane pump 10', a rotary drive mechanism 68" is mounted in housing 18" and operable to position the slide ring 54". The rotary drive mechanism 68" includes a cam 66" is rotatably coupled to an electronic motor 70" and engages a surface on the slide arm 64". A spring 72'" is seated between the housing 18" and a surface on the slide arm 64" opposite the cam 66". The spring 72" is operable to keep the slide arm 64" in contact with the cam 66". In response to the control signal (indicated by a dashed line 74") from the motor controller 76", the electronic motor 70" rotates the cam 66" to impart a force on the slide arm 64" causing the slide ring 54' to pivot about the slide ring pivot 62'. Once so positioned, the slide ring 54' is held in place by the rotary drive mechanism 68' without providing additional power to the electronic motor 70'. One skilled in the art will recognize that the lobe profile of the cam 66" may be configured to coordinate rotation of the slide ring 54" in response to rotation of the cam 66" in a proportional or non-linear manner.

Figure 6:
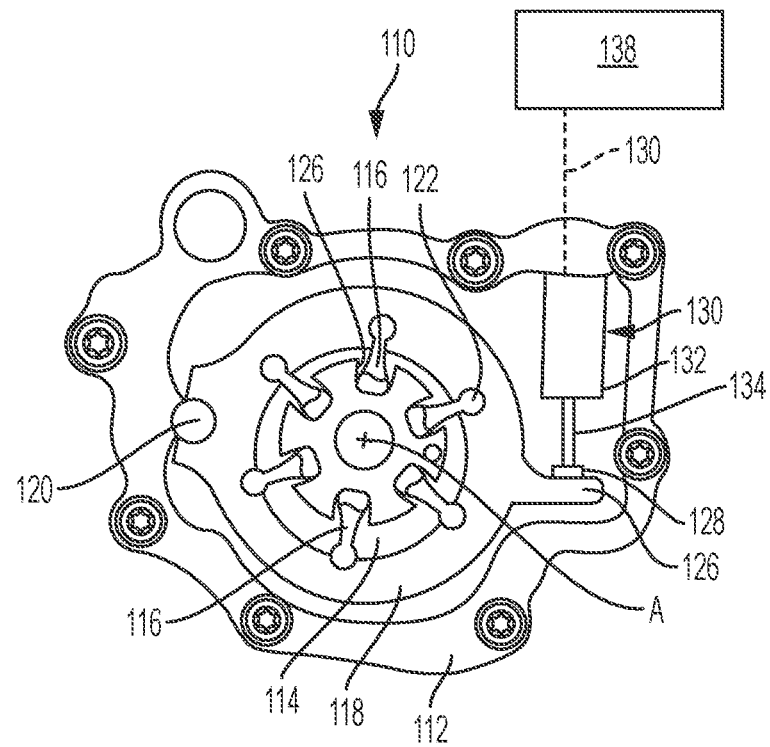
FIG. 6 is a plan view of a pendulum slider oil pump with the top cover of the housing removed to show a linear drive motor configured to pivot a pendulum cage for varying the displacement of the oil pump.

In FIG. 6, a pendulum-slider pump 110 includes a housing 112. A rotor 114 is rotatably supported in the housing 112 and driven by a drive shaft 36 on a fixed axis A. The rotor 114 is operatively connected via pendulum vanes 116 to a slide ring 118. The slide ring 118 is pivotable about a slide ring pivot 120. The pendulum vanes 116 are pivotably mounted at 122 on the slide ring 118 and received in a radially displaceable manner in slots 124 in the rotor 114. A slide arm 126 extends outward from the slide ring 118 at a location opposite from the slide ring pivot 120. The slide arm 126 includes a drive mount 128.

A linear drive mechanism 130 is mounted in the housing 112 and includes an electronic motor 132 and a linear actuator 134 coupled to the drive mount 128. While a linear drive mechanism is shown in this embodiment, one skilled in the art will recognize that the vane pump 110 may be configured with a rotary drive mechanism as shown and described in referent to FIGS. 4 and/or 5. In response to a control signal (indicated by a dashed line 136) from a motor controller 138, the linear actuator 134 extends or retracts along its longitudinal axis such that linear drive mechanism 130 imparts a force on the slide arm 126 causing the slide ring 118 to pivot about the slide ring pivot 120. Once so positioned, the slide ring 118 is held in place by the linear drive mechanism 130 without providing additional power to the electronic motor 132. By rotating the slide ring 118 about the slide ring pivot 120, the displacement of the pendulum slider pump 110 can be controlled, by changing the eccentricity of the rotor 114 with respect to the slide ring 118.

Figure 7:
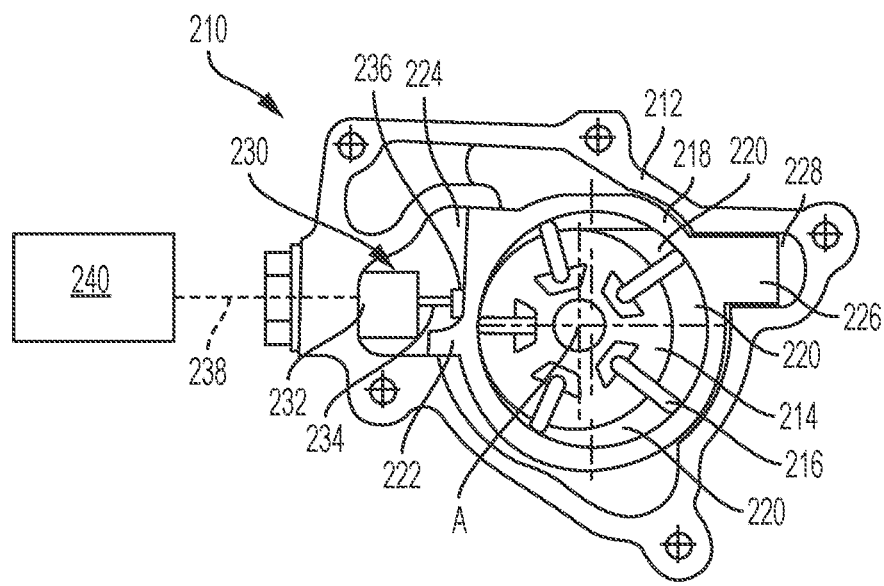
FIG. 7 is a plan view of a vane oil pump with the top cover of the housing removed to show a linear drive motor configured to slide a ring for varying the displacement of the oil pump.

In FIG. 7, a variable displacement vane pump 210 includes a housing 212. A rotor 214 is rotatably supported in the housing 212 and driven by a drive shaft 36 on a fixed axis A. The rotor 214 includes a plurality of slide vanes 216 that internally engage a slide ring 218 to define pumping chambers 220 within the slide ring 218. A guide member 222 is formed on the circumference of the slide ring 218 and is received in a guide slot 224 provided in the housing 212. A projection 226 is formed on the circumference of the slide ring 218 opposite the guide member 222 and is received in a corresponding recess 228 provided in the housing 212. The guide member 222 and the projection 226 support the slide ring 218 linear sliding movement in the housing 212.

A linear drive mechanism 230 is mounted in the housing 212 and includes an electronic motor 232 and a linear actuator 234 coupled to a drive mount 236. While a linear drive mechanism is shown in this embodiment, one skilled in the art will recognize that the vane pump 210 may be configured with a rotary drive mechanism as shown and described in referent to FIGS. 4 and/or 5. In response to a control signal (indicated by a dashed line 238) from a motor controller 240, the linear actuator 234 extends or retracts along its longitudinal axis such that linear drive mechanism 230 positions the slide ring 218 to change its eccentricity relative to the rotor 212, thereby varying the displacement of the vane pump 210. Once so positioned, the slide ring 218 is held in place by the linear drive mechanism 240 without providing additional power to the electronic motor 232.

In the above-described embodiments, the drive mechanism must be capable of providing an adequate range of motion, for example approximately 7-10 mm stroke, and sufficient force and/or torque to overcome the internal hydraulic forces and friction acting on the slide ring. The electronic oil pressure control enabled with the use of an electronic drive mechanism for positioning the slide ring provides more accurate and more stable oil pressure, and eliminates hydraulically generated oil pressure pulsations. Moreover, the engine oil lubrication system is not limited to a lowest desired oil pressure and can respond more quickly to provide the desired oil pressure, particularly at a cold engine start condition. As a result, the engine oil lubrication system is easier and faster to calibrate and has less oil flow/leakage, which yields reduced fuel consumption. Finally, the engine oil lubrication system disclosed herein simplifies the oil pump components which may provide a cost savings and/or packaging space reduction.

While several exemplary embodiments have been presented in the foregoing detailed description, it should be appreciated that a vast number of variations exist. It should also be appreciated that the exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes and/or combinations may be made in the function and arrangement of elements described in an exemplary embodiment without departing from the scope of the invention as set forth in the appended claims and their legal equivalents.

What we claim is:

1. A variable displacement oil pump comprising:
a rotor supported in a housing for rotation about an axis of rotation;
a slide ring movably supported in the housing, the slide ring being formed with a guide member slidingly received within a complimentary guide slot formed in the housing;
a plurality of vanes extending between the rotor and the slide ring to define a plurality of variable displacement pumping chambers;
an electronic drive mechanism configured to position the slide ring with respect to the axis of rotation; and
a controller configured to drive the electronic drive mechanism for selectively positioning the slide ring to adjust an eccentricity of the slide ring relative to the axis of rotation such that a displacement of the pumping chambers is varied;
wherein engagement of the guide member within the complimentary guide slot provides for linear displacement of the slide ring from a first position relative to the axis of rotation corresponding to a first oil pump output to a second position, different that the first position, relative to the axis of rotation corresponding to a second oil pump output.

2. The variable displacement oil pump according to claim 1, wherein the electronic drive mechanism comprises an electronic motor and a drive mechanism coupling the electronic motor to the slide ring for selectively positioning the slide ring.

3. The variable displacement oil pump according to claim 2, wherein the drive mechanism comprises a linear actuator operably coupled between the electronic motor and the slide ring.

4. The variable displacement oil pump according to claim 2, wherein the drive mechanism comprises a drive gear rotated by the electronic motor and a driven gear coupled to the slide ring and meshingly engaging the drive gear.

5. The variable displacement oil pump according to claim 2, wherein the drive mechanism comprises a cam operably rotatably coupled to the electronic motor and engaging the slide ring.

6. The variable displacement oil pump according to claim 1, further comprising a slide arm extending from the slide ring and a drive mount coupling a linear actuator between the electronic motor and the slide arm for displacing the slide ring from the first position to the second position.

7. The variable displacement oil pump according to claim 1, wherein the drive mechanism comprises a drive gear rotated by the electronic motor and a driven gear coupled to the slide ring and meshingly engaging the drive gear for rotating displacing the slide ring from the first position to the second position.

8. The variable displacement oil pump according to claim 7, wherein the driven gear comprises a gear sector formed in the slide ring.

9. The variable displacement oil pump according to claim 1, further comprising a slide arm extending from the slide ring and a cam rotatably coupled to the electronic motor and engaging the slide arm for displacing the slide ring from the first position to the second position.

10. An internal combustion engine comprising:
a cylinder block with lubrication passages for supplying pressurized oil to components of the engine;
an oil pan mounted below the engine block having an oil sump for containing lubricating oil;
a variable displacement oil pump having an inlet in fluid communication with the oil sump to draw oil therefrom and an outlet in fluid communication with the lubrication passages to supply pressurized oil to the engine components, the oil pump comprising a rotor supported in a housing for rotation about an axis of rotation, a slide ring movably supported in the housing, the slide ring being formed with a guide member slidingly received within a complimentary guide slot formed in the housing, a plurality of vanes extending between the rotor and the slide ring to define a plurality of variable displacement pumping chambers including a first pumping chamber in fluid communication with the inlet and a second pumping chamber in fluid communication with the outlet, and an electronic drive mechanism configured to position the slide ring with respect to the axis of rotation; and
a controller configured to drive the electronic drive mechanism for selectively positioning the slide ring to adjust an eccentricity of the slide ring relative to the axis of rotation such that a displacement of the pumping chambers is varied;
wherein engagement of the guide member within the complimentary guide slot provides for linear displacement of the slide ring from a first position relative to the axis of rotation corresponding to a first oil pump output to a second position, different that the first position, relative to the axis of rotation corresponding to a second oil pump output.

11. The internal combustion engine according to claim 10, further comprising a slide arm extending from the slide ring and a drive mount coupling a linear actuator between the electronic motor and the slide arm for displacing the slide ring from the first position to the second position.

12. The internal combustion engine according to claim 10, wherein the drive mechanism comprises a drive gear rotated by the electronic motor and a driven gear coupled to the slide ring and meshingly engaging the drive gear for displacing the slide ring from the first position to the second position.

13. The internal combustion engine according to claim 10 further comprising a slide arm extending from the slide ring and a cam rotatably coupled to the electronic motor and engaging the slide arm for displacing the slide ring from the first position to the second position.

* * * * *